United States Patent
Ross

(10) Patent No.: US 6,741,186 B2
(45) Date of Patent: May 25, 2004

(54) INFRARED ROAD LINE DETECTOR

(76) Inventor: Phillip N. Ross, 4536 S. 250 West, Washington Ter., UT (US) 84405

( * ) Notice: Subject to any disclaimer, the term of this patent is extended or adjusted under 35 U.S.C. 154(b) by 0 days.

(21) Appl. No.: 10/328,815

(22) Filed: Dec. 24, 2002

(65) Prior Publication Data

US 2003/0128106 A1 Jul. 10, 2003

Related U.S. Application Data

(63) Continuation-in-part of application No. 09/865,070, filed on May 24, 2001, now Pat. No. 6,498,570.

(51) Int. Cl.$^7$ ................................................ B08G 1/00
(52) U.S. Cl. ........................ 340/901; 340/904; 340/905; 340/942; 250/239; 250/397
(58) Field of Search ................................ 340/901, 904, 340/905, 933, 942, 438, 439; 250/239, 397; 180/167, 169; 701/300, 301

(56) References Cited

U.S. PATENT DOCUMENTS

| | | | |
|---|---|---|---|
| 3,708,668 A | | 1/1973 | Tilley |
| 4,143,264 A | | 3/1979 | Gilbert et al. |
| 4,348,652 A | | 9/1982 | Barnes et al. |
| 4,401,181 A | | 8/1983 | Schwarz |
| 5,225,827 A | * | 7/1993 | Persson ...................... 340/904 |
| 5,229,602 A | | 7/1993 | Juliger |
| 5,318,143 A | | 6/1994 | Parker et al. |
| 5,568,137 A | | 10/1996 | Liu |
| 5,668,539 A | | 9/1997 | Patchell |
| 5,790,403 A | | 8/1998 | Nakayama |
| 5,957,983 A | | 9/1999 | Tominaga |
| 5,979,581 A | | 11/1999 | Ravani et al. |
| 5,982,278 A | | 11/1999 | Cuvelier |
| 6,005,492 A | * | 12/1999 | Tamura et al. .............. 340/937 |
| 6,470,273 B2 | * | 10/2002 | Halsted et al. .............. 701/301 |

* cited by examiner

*Primary Examiner*—Daryl Pope
(74) *Attorney, Agent, or Firm*—Mallinckrodt & Mallinckrodt; Robert R. Mallinckrodt

(57) ABSTRACT

A detector for detecting light, such as infrared light, reflected from discontinuous lane dividing lines or other lines on a highway surface from a moving motor vehicle to determine the position of the vehicle on the highway detects light reflected from the surface of the highway and includes circuitry to determine from the reflected light sensed not only the presence of a road line but a characteristic of the road line sensed to determine if the road line detected is consistent with previously detected road lines and therefore appears to be a valid road line. The alarm, when enabled, is activated unless a road line consistent with previously sensed road lines is sensed within successive fixed periods of time in which it is expected that a line should be sensed. By detecting the beginning and end of a signal, various characteristics of the sensed line can be determined, and such things as the type of line likely sensed or the speed of travel of the vehicle can also be determined.

28 Claims, 9 Drawing Sheets

Figure 4:
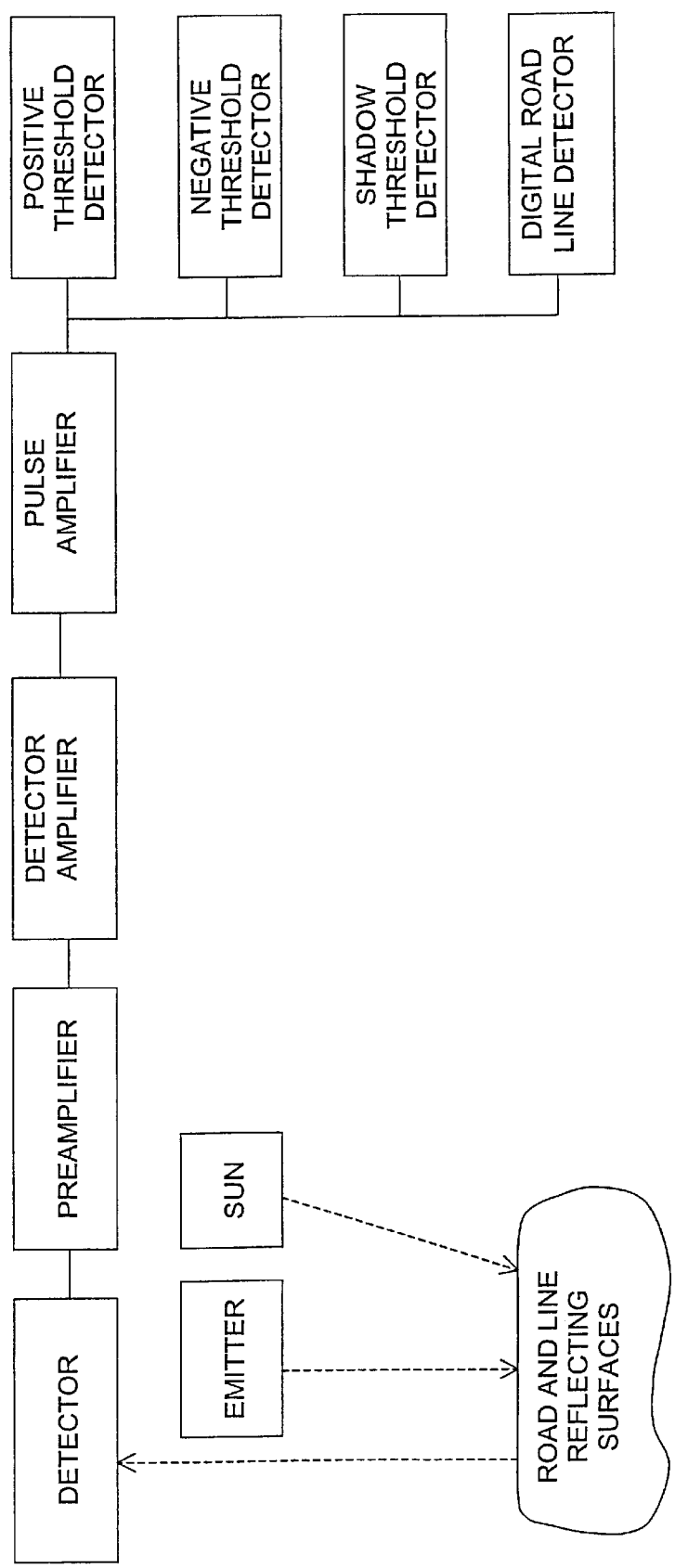

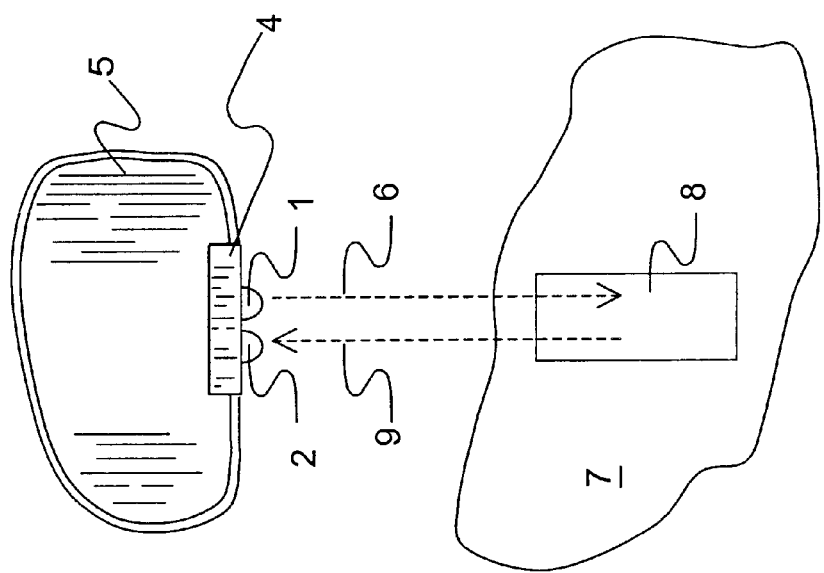
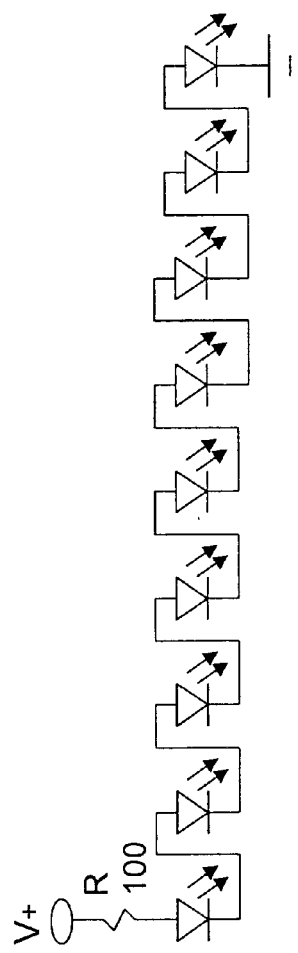
FIG. 1
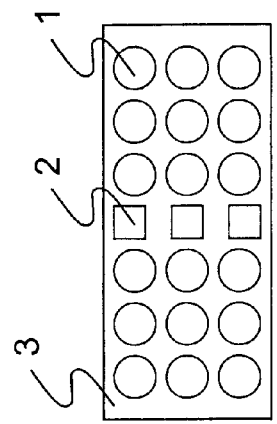
FIG. 2
FIG. 3

INFRARED ROAD LINE DETECTOR

RELATED APPLICATION

This is a continuation-in-part of application Ser. No. 09/865,070, filed May 24, 2001, and entitled "Optical Highway Line Detector" now U.S. Pat. No. 6,498,570.

BACKGROUND OF THE INVENTION

1. Field

The invention is in the field of detection of lines on the surface of a road or highway from a moving motor vehicle.

2. State of the Art

According to the Intelligent Transportation Systems of America newly developed strategic ten year plan, vehicle safety systems such as a road line detector could save thousands of lives on our nations highways. The staggering increase in cell phone use by drivers and introduction of high-tech in-vehicle entertainment and navigation systems has resulted in increased driver distraction. As a result, research and development of Lane Departure and Warning Systems has increased and mandating such devices in Federal vehicles for evaluation are being considered.

It has been realized since at least 1973, U.S. Pat. No. 3,708,668, that it would be desirable to have a device for motor vehicles that would detect road lines and sound or display an alarm to alert the driver of the vehicle when the vehicle approached or crossed such a line so the driver could correct and stay within his or her lane and avoid unintentional lateral drift or lane departure.

Since the present invention can detect vehicle lateral drift, drunk-driving characteristics such as excessive weaving can also be detected.

It was recognized as early as U.S. Pat. No. 3,708,668 that a significant problem with such a system is compensating for different ambient light levels. Thus, such a system has to be able to detect road lines in bright sunlight as well as in darkness at night. U.S. Pat. No. 3,708,668 provides a pair of sensors that balance each other when both detect a road surface, but result in a warning signal when one sensor detects a light reflecting line and the other does not. U.S. Pat. No. 4,143,264 provides a bridge circuit with an impedance element controlled by an integrated output of the bridge circuit to maintain a balance of the bridge for ambient light conditions and vary sensitivity of the detector with light conditions. Various infrared, laser, and CCD camera devices have also been suggested, U.S. Pat. Nos. 4,348,652, 5,979,581, 5,790,403, and 5,957,983. U.S. Pat. No. 5,982,278 shows various arrangements of detectors for detecting road lines and special line arrangements but does not teach any specific detection circuitry. The search for a practical device to provide satisfactory road line detection has continued and a number of devices have been suggested.

U.S. Pat. No. 5,318,143 provides a device that utilize infrared emitters and detectors beneath a vehicle that could be used to detect a stripe placed in the middle of a lane. Sunlight and shadows, however, can be observed on the roadway under the vehicle around the time the sun is setting, due to the extreme angle of the sun. This extraneous sunlight would likely interfere with the detector operation resulting in severely degraded performance. Further, road lines are located along the sides of the lane and never in the middle of the lane therefore, the device is impractical. However, the need remains for a reliable and inexpensive line detector that can be easily mounted in side mirrors or other practical location on a vehicle and effectively detect road lines under various ambient lighting conditions.

In my co-pending application Ser. No. 09/865,070, I disclose a system which determines if lines are detected within successive fixed periods of time in which it is expected that a line should be detected, and if a line is not detected in such periods of time, indicating possible lateral drift of the vehicle out of the lane, an alarm is given. In such system, it has been found that extraneous signals, such as short noise signals or signals from road irregularities or items on the road can be mistaken for road line signals and keep the alarm from providing an alarm signal. Improvements can be made to such system to increase its accuracy of detection.

SUMMARY OF THE INVENTION

According to the invention, a detector for detecting light reflected from discontinuous lane dividing lines or other lines on a highway surface from a moving motor vehicle to determine the position of the vehicle on the highway includes a detector to detect light reflected from the surface of the highway and means to determine from the reflected light sensed not only the presence of road lines but a characteristic of the road line determined to be present to determine if the characteristic of the road line detected is consistent with previously detected road lines and therefore appears to be a valid road line. The alarm, when enabled, is activated unless a road line consistent with previously sensed road lines is sensed within successive fixed periods of time in which it is expected that a line should be sensed. The presently preferred system detects the beginning and end of a road line sensed and determines the length of the road line from the time between sensing of the beginning and end of the line. If the length is consistent with previously sensed road lines, the sensed road line is treated as a valid road line. If the length is not consistent, the sensed road line is not a valid line and may represent a noise signal or the sensing of something on the highway surface other than a valid line such as a paint spot, road kill or other debris on the road surface, a road reflector, etc. In such case, the inconsistent line sensed is ignored. Also, by using a programmed computer to evaluate the sensed line, various characteristics of the sensed line can be determined, and, in addition to determining whether the line sensed is a valid line, various other things, such as the type of line likely sensed or the speed of travel of the vehicle can be determined.

In addition, a line detector system must be able to accommodate daytime as well as nighttime driving for it to be a useful lane departure and warning system. The inventor has discovered that the use of large area photodiodes in conjunction with infrared emitters, energized while driving at night, allows the device to operate under all environmental lighting conditions. Large area photodiodes are used in such applications as remote control receivers in stereos and televisions. A large area photodiode has a large chip surface area that produces more photocurrent than small area photodiodes, therefore large area photodiodes are more sensitive to light and light level changes. Large area photodiodes are also more sensitive in very low light level conditions such as during nighttime driving. In the preferred embodiment, the large area photodiode produces a reverse voltage across the anode and cathode junction that increases or decreases proportionally with the infrared light striking the exposed silicon chip. The proposed Infrared Road Line Detector differs from prior art because it detects the time interval between the start and end of individual road line segments. This method provides superior timing parameters for implementing capabilities such as vehicle speed calculations in addition to allowing faster validation that road line segments are detected. Finally, the waveform produced by light level changes associated with the start and end of a road line are very compatible with threshold detectors. Hence, the present patent offers a simple, inexpensive, versatile and very effective method to detect road lines under all lighting conditions, and in particular, at night. Detectors and emitters can be implemented on both sides of the vehicle in order to detect road lines on both sides of the lane resulting in a more functional invention. An analog to digital converter and microprocessor is added to the invention to allow sampling and analysis of solid road lines as well as individual road line segments.

THE DRAWINGS

Figure 5:
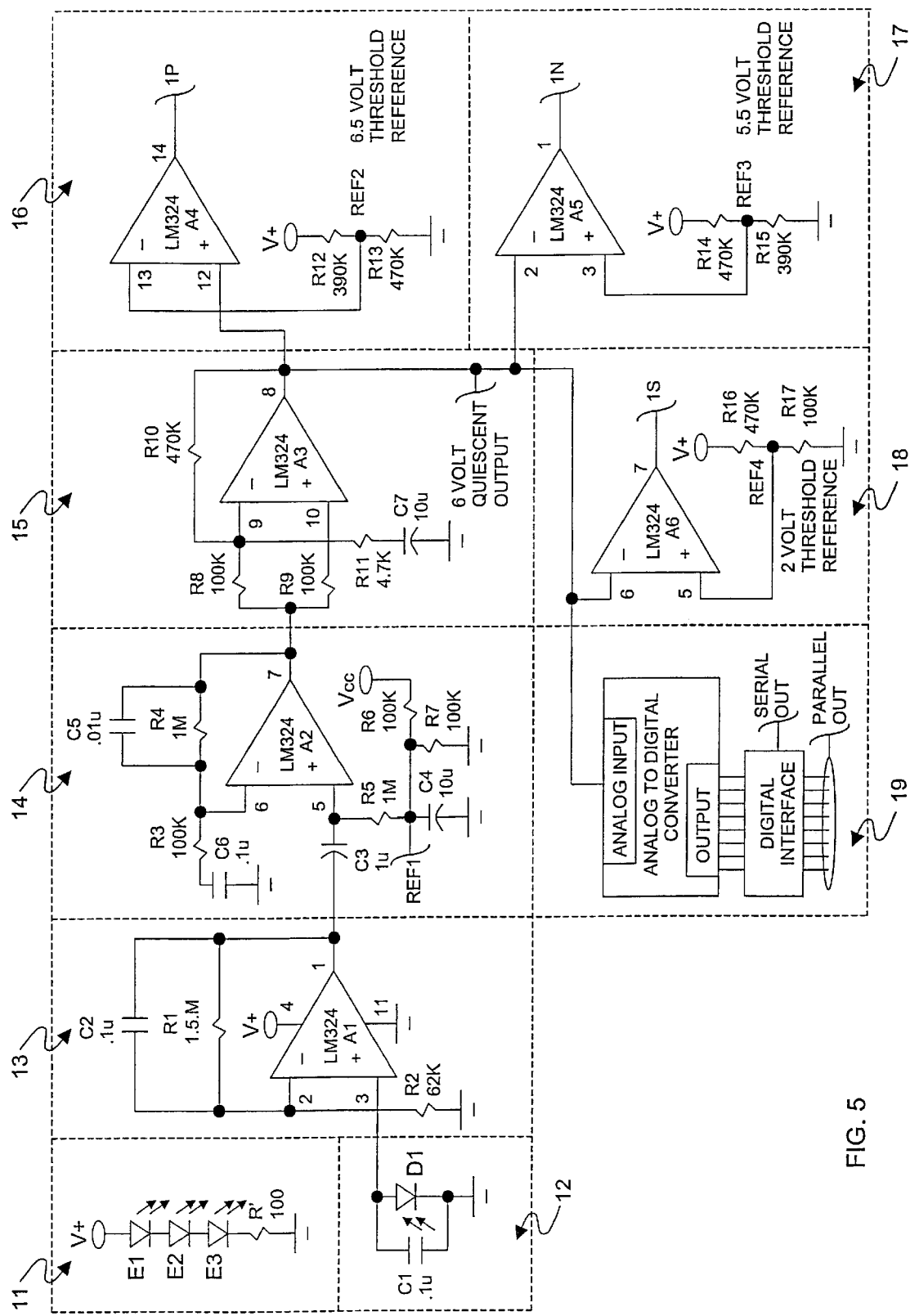
Figure 6:
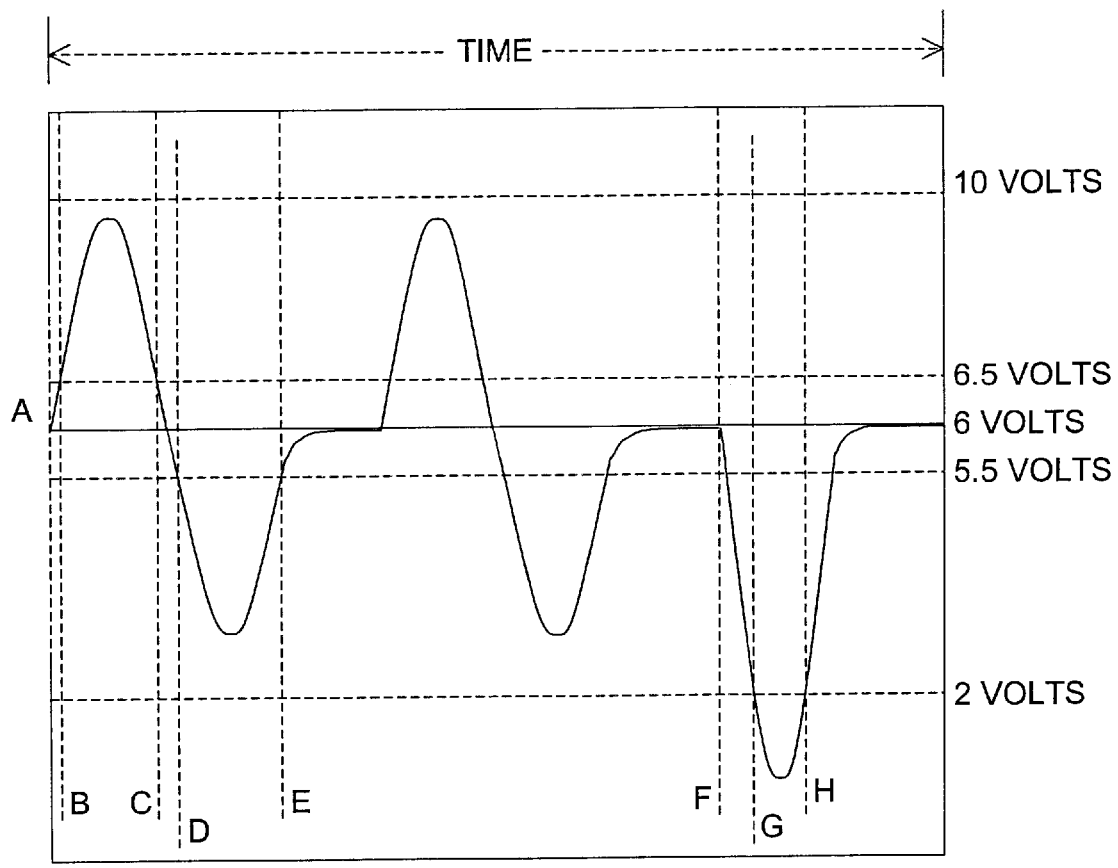
Figure 7:
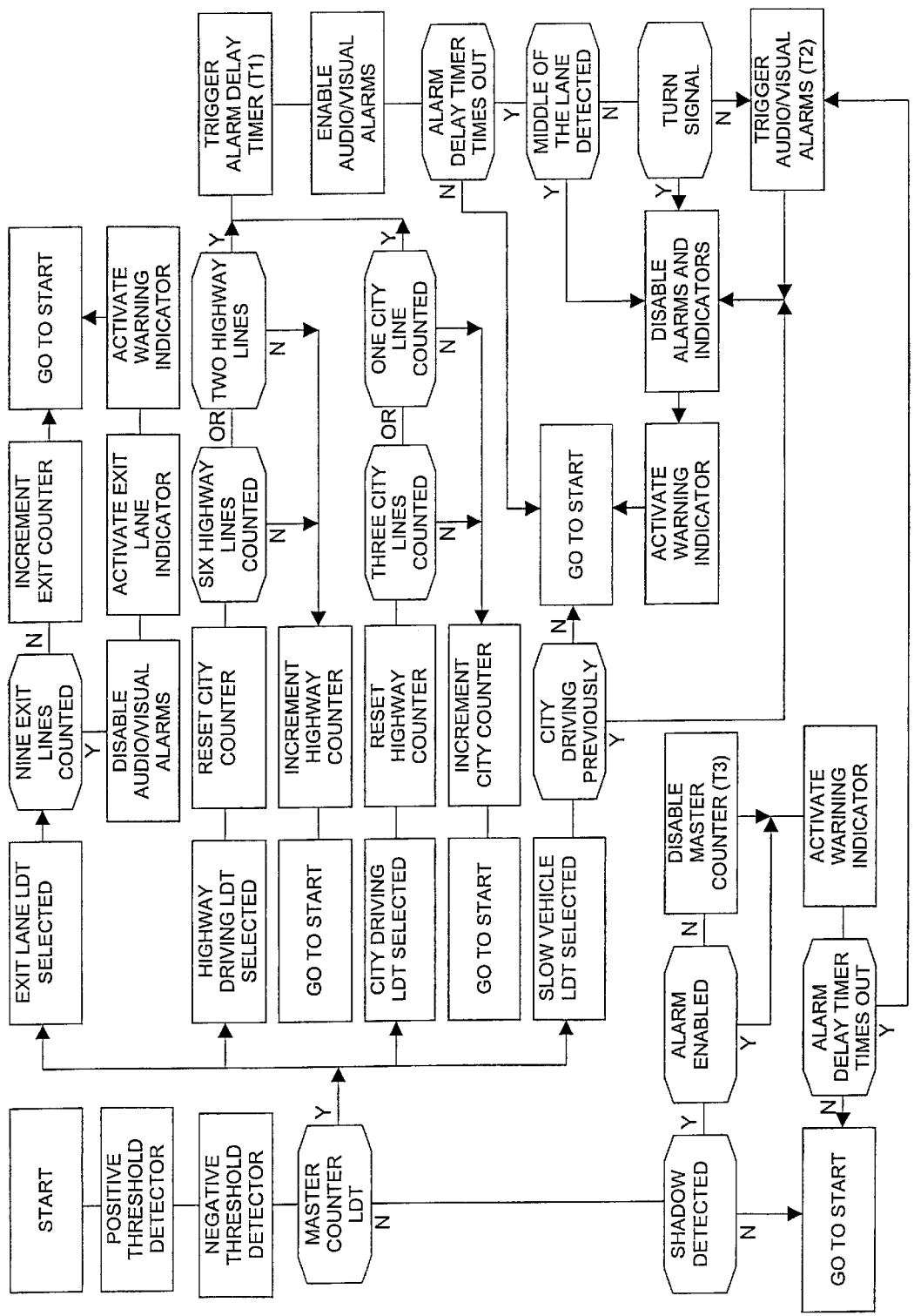
Figure 8:
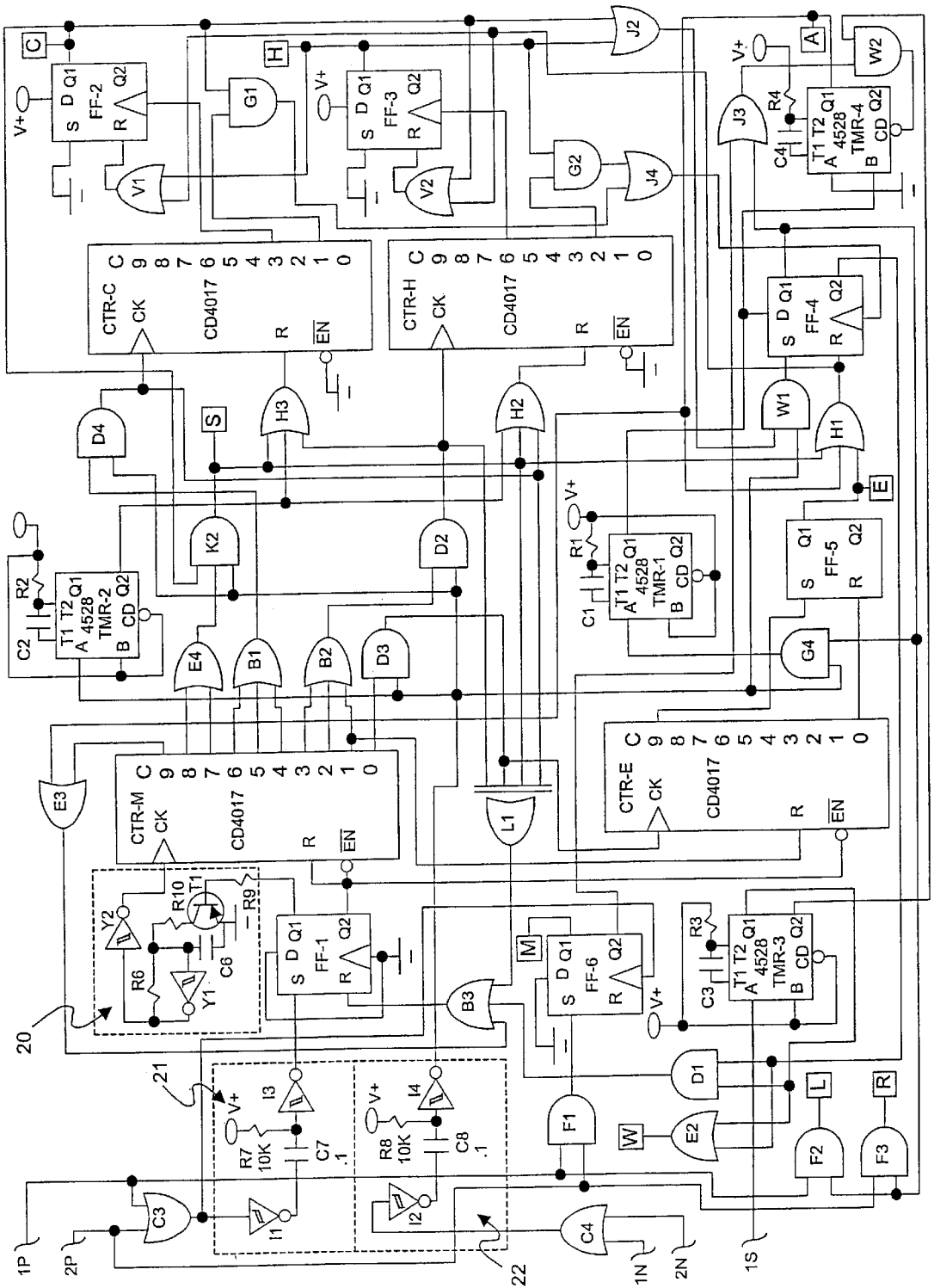
Figure 9:
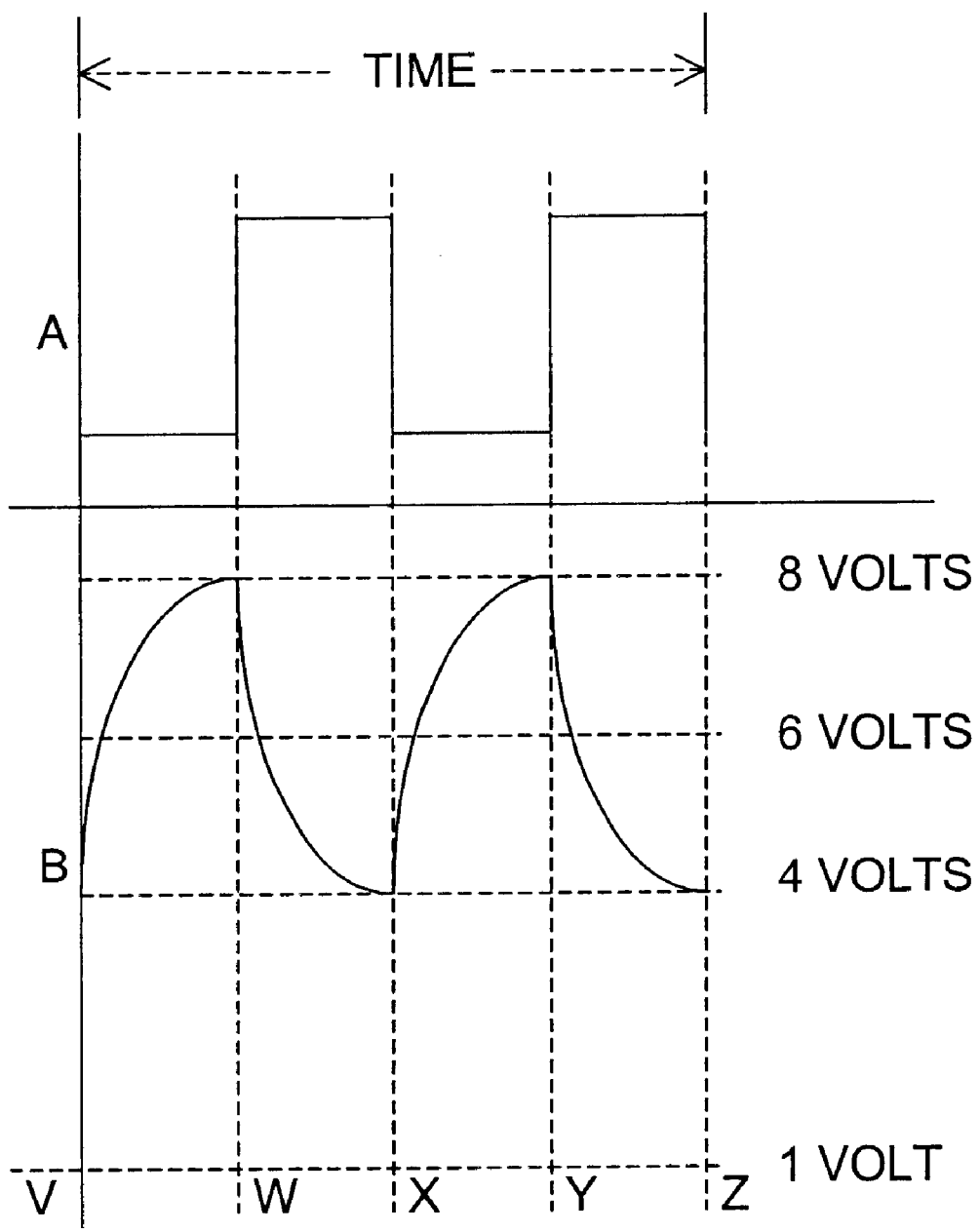
Figure 10:
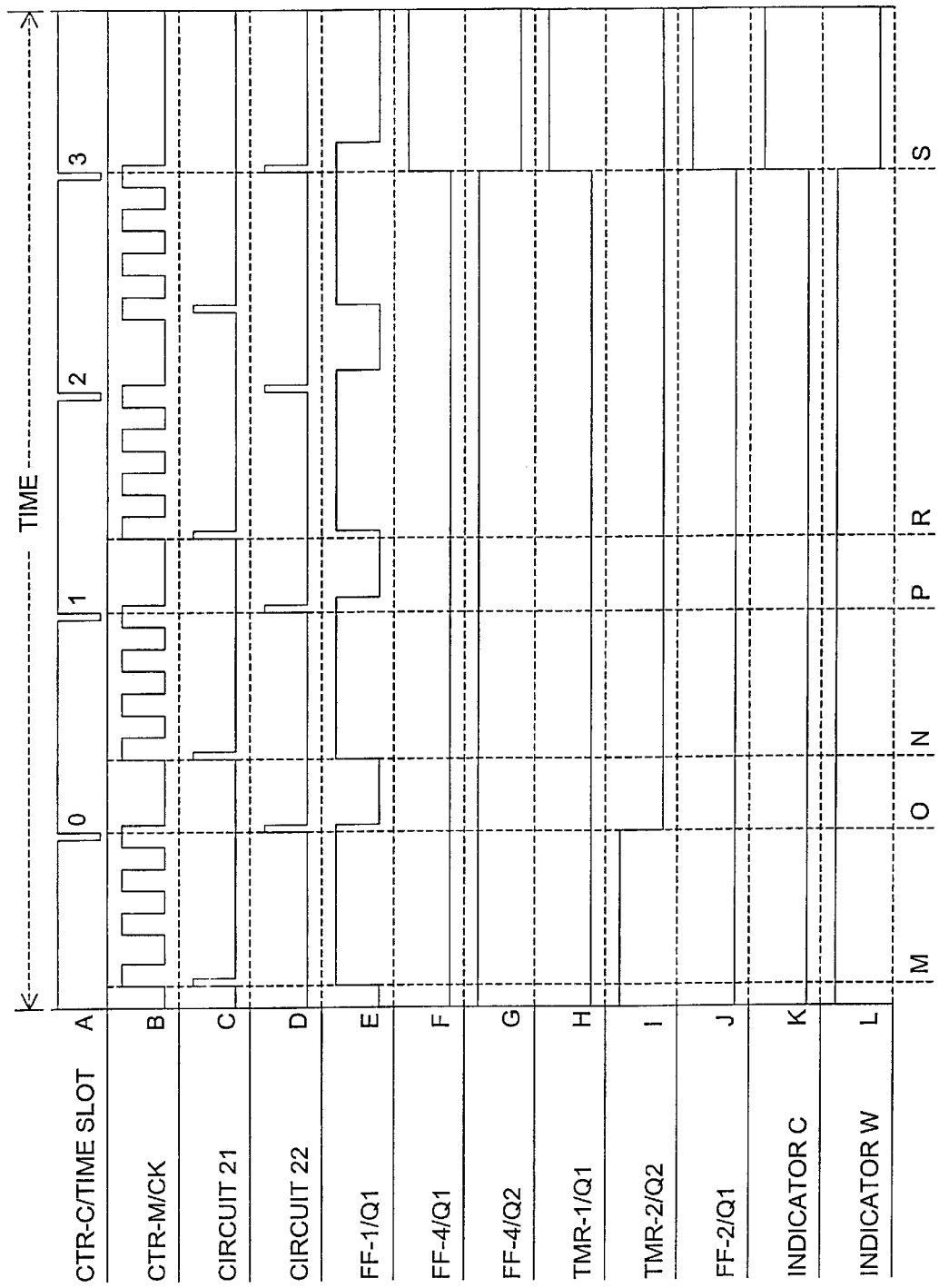

The best mode presently contemplated for carrying out the invention in actual practice is illustrated in the accompanying drawings, in which:

FIG. 1, a schematic representation of infrared emitters;

FIG. 2, a schematic representation of infrared emitters of FIG. 1 in addition to infrared detectors on a mounting surface;

FIG. 3, a somewhat schematic representation of the embodiment of the emitters and collectors of FIGS. 1 and 2, with a partial road line;

FIG. 4, a block diagram of the analog road line detector circuits;

FIG. 5, a circuit diagram of the analog portion of the invention including the components of FIGS. 1 and 2;

FIG. 6, a waveform of the circuits of FIG. 5;

FIG. 7, a logic flow block diagram of a portion of the circuitry of the invention;

FIG. 8, a circuit diagram of the digital circuits used to process the analog signals generated in the circuits of FIG. 5;

FIG. 9, a waveform of the clock circuit of FIG. 8;

FIG. 10, a timing diagram showing signals associated with FIG. 8; and

Figure 11:
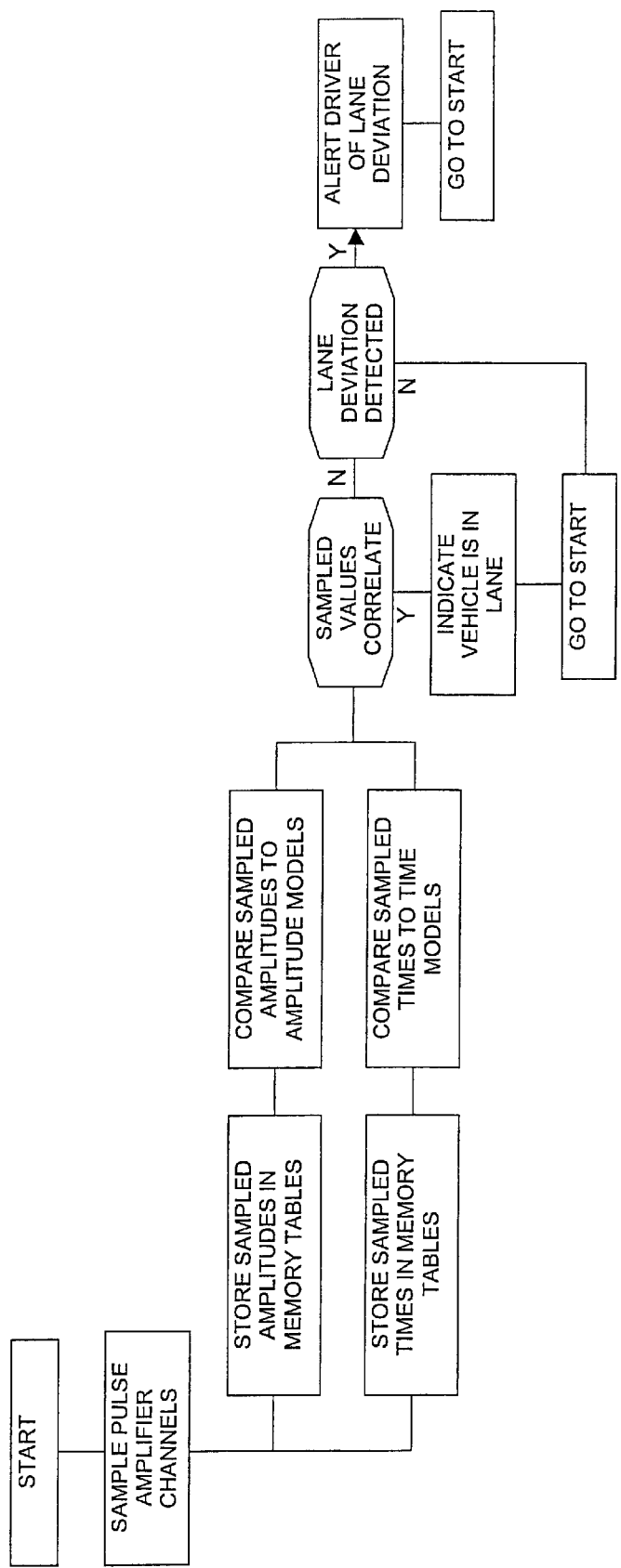

FIG. 11, a flow-chart showing the Digital Road Line Detector for circuit 19 of FIG. 5.

DETAILED DESCRIPTION OF THE ILLUSTRATED EMBODIMENT

FIG. 1 shows multiple infrared emitters connected in series to produce a combined infrared light source for the detectors to sense road lines during nighttime driving. The emitters are connected in series whereas the sum of the emitter voltages are equal to the supply voltage. For example, if the supply voltage V+ of the circuit of FIG. 1 is twelve volts and emitters are identical, with nine emitters and a resistor R, each emitter would drop one ninth of the voltage not dropped by the resistor. The emitter maximum voltage rating must therefore be sufficient to avoid damage to the emitters at the expected voltage. Emitters connected in series is preferred over emitters connected in parallel because a parallel circuit would require a resistor in series with each emitter to drop the supply voltage to the specified emitter voltage. This resistor would add additional cost to the device, be large in size, and consume substantial power that would produce unwanted heat that could damage the emitters if they were too close to the resistor.

FIG. 2 shows the embodiment of multiple infrared emitters 1 and multiple infrared detectors 2 on a mounting surface 3. The mounting surface could be a printed circuit board and incorporate an emitter holder designed to direct the individual emitter beams at various slight angles to each other resulting in a more uniform infrared lighted area on the road. The mounting surface could also be in a curved or domed shape to aim emitters at various slight angles to the roadway.

FIG. 3 shows an emitter and detector of FIG. 2 mounted on an outside mirror of a vehicle with the emitter and detector aimed at a road line. Referring to FIG. 3, an emitter 1 mounted on mounting surface 4 and positioned on an outside vehicle mirror 5, emits infrared light along path 6 to the road 7 and road line 8. Infrared light is, in return, reflected back from road 7 and road line 8 along path 9 to the detector 2 on mounting surface 4. More infrared light is reflected back to the detector in the area on the road where a road line is present. FIG. 3 shows only one emitter and detector for purposes of illustration, although multiple emitters and detectors, as shown in FIG. 2 would be used.

FIG. 4 is a block diagram depicting the basic line detector comprising an infrared Emitter, Detector, Preamplifier, Detector Amplifier, Pulse Amplifier and Threshold Detectors. A block representing a Digital Road Line Detector circuit is also shown. Infrared light from the Emitter strikes the Road and Line Reflecting Surfaces and a portion of the light is reflected back to the Detector. Infrared light from the Sun is also reflected from the Road and Line Reflecting Surfaces to the Detector and is the dominant source of infrared light during daytime driving. The Detector is a photodiode operating in the photovoltaic mode. As a road line passes in front of the photodiode, light reflected from the road line results in a change in the voltage generated by and across the photodiode. The Preamplifier amplifies the Detector changing voltage produced by the photodiode. The Detector Amplifier blocks the DC current from the output of the Preamplifier and detects and amplifies the changing voltage from the output of the Preamplifier. The Pulse Amplifier further amplifies this changing voltage to a level that will result in Threshold Detectors switching on and off, or, conversely, off and on depending on the polarity desired at the threshold detector outputs. The Positive Threshold Detector produces a pulse when the start of a road line is detected and the Negative Threshold Detector produces a pulse when the end of a road line is detected. The time between the occurrence of a Positive Threshold Detector pulse and Negative Threshold Detector pulse is the basis for line timing analysis in the proceeding circuits. Further, threshold Detectors are referenced at various voltages in order to distinguish between lines and shadows. For example, the Shadow Threshold Detector reference voltage is such that the Negative Threshold Detector output polarity switches indicating the occurrence of a shadow. Shadows can therefore be distinguished from road lines and processed as extraneous detection signals rather than a road line by the proceeding logic and timing circuits.

A Digital Road Line Detector is also connected to the output of the Pulse Amplifier. The digital value, or binary word, is transferred via a serial or parallel connection to a computer for comparison to other detector channels as a means to determine the vehicle lane position or lateral drift on a roadway with respect to solid or individual road line segments.

FIG. 5 shows one channel (each of the photodetectors would constitute a channel) of the analog detection circuitry of the Infrared Road Line Detector comprising infrared emitters, a photodiode detector and associated operational amplifier and threshold detector circuits. Also included is an analog to digital circuit that interfaces to a microprocessor for solid and individual road line segment detection. It should be understood that only one detection channel is shown whereas a plurality of channels could be implemented. The emitter and detector spectral response should match as closely as possible for optimum performance of the detection system particularly during nighttime driving. Infrared emitters are preferred because infrared light is not detectable by the human eye and therefore would not distract vehicle operators like conventional light sources would. Infrared light also offers an intrinsic quality due simply to its ominous invisible characteristic. In addition, fluorescent light, as well as many other manmade light sources are outside the infrared detection frequency response and therefore would not interfere with the system operation.

It should be understood that the operational amplifiers shown in the various FIGS., as well as other component blocks representing integrated circuits, are supplied with positive voltage V+ and are connected to ground as needed and in a well-known manner even though the supply voltage and ground connections are not shown. A twelve-volt battery power source, commonly used in automotive applications, is used to supply power to the circuits of FIG. 5 and is shown to be twelve volts in the circuits even though a vehicle power system can actually be greater or lower than twelve volts.

Emitter circuit 11 is shown as including emitters E1, E2 and E3 and resistor R', although nine emitters as shown in FIG. 1, would probably be used. The emitters provide a combined infrared light source on the roadway to illuminate road lines during nighttime driving. The emitters can be energized at the same time the headlights are turned on or simply be on while the vehicle is running. Three emitters are shown in emitter circuit 11 however numerous emitters are likely required for illumination of road lines sufficient for the photodiode to detect them. In emitter circuit 11, a total of thirty-six high-power 60 mW/SR emitters have been found sufficient for producing a combined infrared light source on the roadway for road line detection.

Detector circuit 12 consists of Capacitor C1, placed in parallel with photodiode D1. The capacitor helps stabilize the photodiode voltage, reduces photodiode shot noise and helps eliminate the 120 hz ambient light source noise produced by alternating current of roadway lighting systems. Though roadway lighting systems operate from a conventional high-voltage 60 hz power source, a 120 hz noise signal results by the lights turning on and off two times per cycle, hence 120 hz. The output of detector circuit 12 is provided to circuit 13 that consists of operational amplifier A1 and its peripheral components to form a non-inverting DC coupled Preamplifier. The Preamplifier amplifies the voltage at the photodiode cathode. Resistor R1 and capacitor C2 provide feedback from the output of A1 to the inverting input of A1. Bypass capacitor C2 prevents extraneous noise from being amplified by operational amplifier A1. Resistors R1 an R2 determine the DC gain of operational amplifier A1. The output of operational amplifier A1 of circuit 13 is coupled to the noninverting input of detector amplifier 14 by capacitor C3. Capacitor C3 removes DC current produced by amplifier A1 and passes changing current. Changing current corresponds to light level changes resulting from road lines passing through the photodiode or photodetector detection area of the roadway. Generally, the photodiode produces more voltage with more light exposure. In detecting road lines, the lines, which consist of tiny reflective glass beads and light colored line striping paint or reflective road line tape, will reflect more light than the road surface, even with a concrete road or highway. It is the increase in voltage over and above the voltage caused by the ambient light on the road surface that must be detected. It should be understood that yellow lines as well as white lines are lighter colored than the roadway.

Operational amplifier A2 and its peripheral components form detector amplifier 14. Reference voltage REF1 is set midway between the positive and ground or positive and negative power supply voltage in order for the output of pulse amplifier 15 to utilize a corresponding maximum peak-to-peak output range. The maximum power supply voltage is twelve volts so REF1 would ideally be set to six volts. Voltage divider resistors R6 and R7 are of equal resistance resulting in the required six-volt reference. A value of 100K ohms is an acceptable value of R6 and R7. The voltage at REF1 is provided to the noninverting input of operational amplifier A3 through the isolation resistor R5. When using a positive and negative supply voltage, consisting of an equal positive and negative voltage output, reference voltage REF1 would ideally be zero volts.

Resistor R4 and capacitor C5 of circuit 14 provide feedback from the output of operational amplifier A2 to the inverting input of operational amplifier A2. Bypass capacitor C5 prevents undesirable noise from being amplified by A2. Resistors R4 and R3 connected in series with capacitor C6 provide input bias current and amplification of the detected input signal voltage changes that correspond to light level changes caused by broken white road lines. The output of circuit 14 is provided to the inverting and noninverting inputs of Pulse Amplifier 15 by resistor R8 and R9 respectfully. The output of Detector Amplifier 14 is also provided to Digital Road Line Detector 19.

Referring to Pulse Amplifier 15, in the instance no road lines are being detected, Pulse Amplifier 15 produces a quiescent output voltage of about six volts. Operational amplifier A3 amplifies the voltage difference, or waveform, provided by Detector Amplifier 14. With respect to the six-volt quiescent reference voltage, a positive going voltage at the output of 15 corresponds to the start of a road line and a negative going voltage corresponds to the end of a line.

The output of pulse amplifier 15 is provided to threshold detector circuits 16, 17 and 18. The positive threshold detector output is 1P, the negative threshold detector output is 1N and the shadow threshold detector is 1S. The "1" in the designator means channel 1 whereas a multitude of channels could be implemented in a device design.

Reference voltage REF2 of positive threshold detector 16 is 1.2 volts higher than the six volt quiescent output voltage of Pulse Amplifier 15 so that when the output voltage of 15 rises above 7.2 volts, output 1P of operational amplifier A4 goes from a low to a high level output. Similarly, reference voltage REF3 of negative threshold detector 17 is 1.2 volts lower than the 6 volt quiescent output voltage of 15 so that when the output voltage of 15 drops below 4.2 volts, output 1N of operational amplifier A5 goes from a low to a high level output. In general, threshold detector reference voltages must be such that roads with degraded or non-uniform surfaces, due to such anomalies as potholes or cracks, would not result in false road line detection in the instance where no painted road lines exist. These non-uniform surfaces can produce light level changes sensed by the threshold detectors at a sufficient voltage change to cause the threshold detector outputs to toggle. This undesirable toggling would result in road line detection problems.

The output of pulse amplifier 15 is also provided to shadow detector 18. The shadow threshold detector is biased by a resistor divider comprising R16 and R17 at a relatively low level voltage in order to detect the negative going voltage output produced by pulse amplifier 15 in the instance a shadow, caused by such objects as an overpass or tree, is detected. Positive and negative threshold detector output signals 1P and 1N are typically inaccurate with respect to time or missing when a shadow is sensed. The purpose of the shadow threshold detector is to detect shadows and then prevent them from causing road line detection problems. As will be explained later, digital circuitry utilize the shadow detector output 1S to prevent shadows from causing road line detection interference. A two-volt reference voltage REF4 in the shadow detector 18 is satisfactory.

An overpass could be detected by implementing Shadow Threshold Detector 18 and a Positive Threshold Detector, such as circuit 16, to detect the extreme negative and positive going light level changes associated with the transition to a shadow and then back to a sun lit area.

Raised pavement markers can also be detected with threshold detectors, such as threshold detectors 16 and 17, with reference voltages set to about 0.5 volts above and below the ambient six volt output voltage of Pulse Amplifier 15. It should be understood that the threshold detectors could be referenced at a specific voltage to detect faded road lines and also a specific and different reference voltage to detect white road lines on a black asphalt road.

As mentioned, Pulse Amplifier 15 is also connected to Digital Road Line Detector circuit 19 which converts the analog output signal of Pulse Amplifier 15 to a digital signal. Circuit 19 generally consists of an Analog to Digital Converter and Digital Interface. In the instance multiple photodiode detection channels are implemented, the sample time should be the same for the various channels to avoid comparing different reference points on the channel waveforms. Sampled waveform voltages are converted to a digital value by the Analog to Digital Converter. The Analog to Digital Converter output is then provided to a Digital Interface that consists of either a parallel or serial transmission circuit. Many microprocessor compatible analog to digital converters on the market have both serial and parallel outputs available in a single package that can be connected directly to a host computer. The computer firmware or software routines store the sampled digital values in registers of the microprocessor for transfer to other memory storage devices. Digital values of the various detection channels are compared to determine the left or right direction and magnitude of vehicle lateral drift. For example, if the digital value of channel one, sampled at time A, is a lower digital value than the digital value of channel two, sampled also at time A, then the vehicle is closer to the position of the photodiode detecting in the area of channel two.

Computer software programs can be such that thousands or millions of digital values can be compared to determine the exact position of the vehicle in the lane of travel of a roadway with relation to both solid road lines and road line segments. The counter and timer circuits of FIG. 8 can also be implemented with a digital computer. CPU registers can manipulate and perform millions of mathematical operations on the threshold detector signals to analyze the timing characteristics of the analog to digital signals shown in FIG. 5. A faster and more accurate detection and data acquisition device would result. Shadows could easily be detected and eliminated using software routines. Many types of light level changes and patterns could be detected and analyzed by the software to determine road types as well as recognize certain portions of a specific road. Machine code programs have been developed for use with the present invention to calculate the vehicle speed according to the number of road lines detected which are then compared to the speedometer output for validation of the road lines.

FIG. 6 shows the voltage waveform A produced by circuit 15 of FIG. 5 and shows where in relation to waveform A positive threshold detector 1P, negative threshold detector 1N, and shadow threshold detector 1S are triggered to produce their output signals. The six-volt reference voltage is shown with a solid horizontal line. The positive threshold detector output goes from a low to a high level at B and from a high to a low level at C. The negative threshold detector output goes from a low to a high level at D and a high to a low level at E. The Line Detection Time (LDT) of a road line detection is the time between B and D and is determined using the circuits shown in FIG. 8. It should be understood that alternate circuits could be determine the LDT between B and E rather than B and D or other combination of time intervals shown. A road line must be detected within a maximum time interval for it to be a valid road line. This maximum time interval is the Line Detection Time Interval (LDTI). Therefore, the LDT must be within the LDTI or the vehicle speed is too slow for the device to detect the road line. The cruise control of a motor vehicle is similar in the aspect that the speed of a vehicle must be within a certain minimum speed to engage.

Referring again to FIG. 6, a shadow is detected at time F resulting in the shadow threshold detector output going from a low to a high level at time G and from a high to a low level at time H.

FIG. 7 shows a logic flow block diagram of the logic portion of the Infrared Road Line Detector invention. The logic flow begins at the Start logic block and flows to the Positive Threshold Detector logic block, the Negative Threshold Detector logic block and to the Master Counter LDT within LDTI logic decision block. The master counter develops the LDTI whereas a valid road line must occur within this time interval. At the master counter selected time slot is tested to determine if a road line has occurred within the LDTI. If a road line LDT was detected within the LDTI path Y is selected. There are four road line LDTs shown, however numerous other LDTs are possible and the present patent is in no way limited to only the four described. For example, Raised Pavement Markers can also be detected and have many timing pattern characteristics and therefore many LDTs.

The first of the four LDTs is the "exit lane" LDT, the second is the "highway driving" LDT, the third is the "city driving" LDT and the fourth is the "slow vehicle" LDT. If the master counter selected LDT matches the "exit lane" LDT then the Exit Lane LDT Selected logic block path is selected indicating that an exit road line was detected. The number of exit lines counted is then tested at the Nine Exit Lines Counted logic decision block to determine if nine successive exit lines have been counted. In the event nine exit road lines have been counted path Y is selected, otherwise path N is selected and the exit counter is incremented at the Increment Exit Counter logic block and the Go To Start logic block causes the logic flow to return to the Start logic block. In the instance path Y is selected at the Nine Exit Lines Counted logic decision block, the alarm is disabled and the lane exit indicator is activated while exiting lines are detected. Nine is the maximum number that the "decade counter" can count, before going back to zero and is satisfactory for detecting an exit lane. When exit road lines are no longer detected, such as when the vehicle moves laterally toward the exit ramp in the gore area of a highway, the exit lane indicator is then deactivated and the Warning indicator is activated. The warning indicator alerts the driver that the Infrared Road Line Detector is no longer detecting road lines and audio and visual alarms will not activate in the event the vehicle drifts out of its lane. The logic flow continues to the Go To Start logic block at which time the logic flow returns to the Start logic block.

At the Start logic block the logic flow is halted until the event of a Positive Threshold Detector or Negative Threshold Detector signal occurs. The logic flow proceeds from the Start logic block, to the Positive Threshold Detector logic block and then to the Negative Threshold Detector logic block completing a possible road line detection. At the Master Counter LDT within LDTI logic decision block, the LDT is tested to determine if the LDT is within the LDTI as in the case of a valid road line detected. In the event the LDT matches that of a highway road line, the Highway Driving LDT Selected logic block is selected. The city counter is reset at the Reset City Counter logic block since both city and highway driving are not likely at any one time. Erroneous detection signals can also be eliminated at the Reset City Counter logic block because the detection time intervals for these erroneous detection signals are random and sporadic rather than constant and periodic. Alternating between the highway and city driving road line LDT timing continually resets the city and highway counters before the audio and visual alarms can be enabled. The highway counter is then tested to determine if six highway road lines have been consecutively counted. In the event that six highway lines have been counted, the OR path is selected at the Six Highway Lines Counted logic decision block. Since the path between the Six Highway Lines Counted and the Two Highway Lines Counted logic decision blocks is an OR logic decision path, path Y is selected at the Two Highway Lines Counted logic decision block. Once six highway lines have been counted, resulting in the audio and visual alarms being enabled, only two highway road lines are required to prevent the alarms from activating. In this instance only two highway lines need occur before the alarm delay timer times out. In the event the alarms delay timer times out the alarms are activated. Should the alarms activate, such as in the instance the vehicle starts to drift out of its lane, six highway road lines will again be required to enable the alarms. Therefore, more highway road lines are required to initially enable the alarms than to prevent them from activating. This prevents a significant number of false alarms by ensuring that consecutive road lines can be detected before the alarms are enabled. In the instance the six or two required road lines are not yet counted, path N is selected at the appropriate six or two highway lines counted logic decision blocks resulting in the highway counter being incremented at the Increment Highway Counter logic block. The logic flow then continues to the Go To Start logic block where the logic flow returns to the Start logic block. In the instance that six continuous highway road lines are initially detected or two highway lines are detected after six initial highway road lines have been detected, path Y is selected at the Two Highway Lines Counted logic decision block. The logic flow then continues to the Trigger Alarm Delay Timer (T1) logic block.

In the event the master counter LDT matches that of a city road line at the Master Counter LDT within LDTI, the City Driving LDT Selected logic block is selected. The highway counter is reset at the Reset Highway Counter logic block again, because both city and highway driving are not likely at any one time. The city counter is then tested to determine if three city road lines have been consecutively counted. In the event that three city lines have been counted, the OR path is selected at the Three City Lines Counted logic decision block. Since the path between the Three City Lines Counted and the One City Line Counted logic decision blocks is an OR logic decision path, path Y is selected at the One City Lines Counted logic decision block. Once three city lines have been counted, resulting in and the audio and visual alarms being enabled, only one city line need be detected before the alarm delay timer times out to prevent the alarms from activating. In the event the alarms delay timer times out the alarms are activated. Should the alarms activate, such as in the instance the vehicle starts to drift out of its lane, three city road lines will again be required to enable the alarms. Therefore, more city road lines are required to initially enable the alarms than to prevent them from activating. This prevents a significant number of false alarms by ensuring that consecutive road lines can be detected before the alarms are enabled. In the instance the three or one required road lines are not yet counted, path N is selected at the appropriate three or one city line counted logic decision blocks resulting in the city counter being incremented at the Increment City Counter logic block. The logic flow then continues to the Go To Start logic block where the logic flow returns to the Start logic block. In the instance that three continuous city road lines are detected or one city line is detected after three initial city road lines have been detected, path Y is selected. In the instance that path Y is selected at the One City Lines Counted logic decision block, the logic flow then continues to the Trigger Alarm Delay Timer (T1) logic block. The reason that highway counters require twice as many counts than that of the city counters is that there are twice as many road lines detected in the same time period at highway speeds. The desired result is that the same amount of time will be required to enable the alarm circuits during both city and highway driving. When the required number of counts is achieved with the city or highway counters, the logic flow proceeds to the Trigger Alarm Delay Timer (T1). The alarm activation is delayed for time T1 in order for two highway or one city road lines to be detected before activating the alarms in the event road lines were detected and some condition temporarily prevented road lines from being detected. Audio and visual alarms are enabled at the Enable Audio/Visual Alarms logic block. The alarm delay timer is then tested to determine if the alarm delay timer times out at the Alarm Delay Timer Times Out logic decision block. In the event the alarm delay timer does not time out, such as in the instance a road line is detected, path N is selected and the logic flow proceeds to the Go To Start logic block causing the logic flow to return to the Start logic block. In the event the alarm delay timer times out, path Y is selected at the Alarm Delay Timer Times Out logic decision block. The logic flow then continues to the Middle Of The Lane Detected logic decision block where the vehicle position is tested to determine if the vehicle is in the middle of the lane. It is common for road lines to simply cease, particularly during city driving, that would likely result in the audio and visual alarms being activated. However, when the vehicle is in the middle of the lane and then road lines are no longer detected the audio and visual alarms are disabled. In this event path Y is selected and the alarms are disabled at the Disable Alarms And Indicators logic block. In the event the middle of the lane is not detected, path N is selected and the logic flow proceeds to the Turn Signal Activated logic decision block. In the event the driver properly uses the turn signal; the alarms are not activated since the vehicle is intentionally being directed out of the lane. In this instance path Y is selected at the Turn Signal Activated logic decision block. In the event neither the turn signal is activated nor the vehicle is in the middle of the lane, the logic flow proceeds to the Trigger Audio/Visual Alarms (T2) logic block. In this instance, the vehicle is not intentionally being directed out of the lane of travel and is not in the middle of the lane resulting in a possible dangerous driving condition whereas the audio and visual alarms are activated. The logic flow continues to the Activate Warning Indicator logic block where the warning indicator is again activated to alert the driver that the device is no longer detecting road lines. The logic flow proceeds to the Go To Start logic block where the logic flow returns to the Start logic block.

Rather than the Master Counter LDT Within LDTI logic decision block path Y being selected, in the event a low to high level at 1S is detected as described by the circuitry of FIG. 5, or only a Positive Threshold Detector output toggles, path N is selected. Referring to FIG. 7, in the event a shadow was not detected, path N is selected at the Shadow Detected logic decision block and the logic flow returns to the Start logic block. In the event a shadow is detected, path Y is selected and the alarm circuit is tested to determine if the alarm is enabled. If the alarm is not enabled, path N is selected and the logic flow proceeds to the Disable Master Counter (T3) logic block resulting in the master counter being disabled for time period T3 until such time that the shadow or series of shadows ceases. This prevents a series of shadows from inadvertently being confused with the timing of road lines that could result in possible detection problems with the system. A time period of about half a second is satisfactory for time period T3. In the event the alarm is enabled, path Y at the Alarm Enabled logic decision block is selected. The warning indicator is then activated at the Activate Warning Indicator logic block during the time period that a shadow or series of shadows is detected. If shadows continue such that road lines cannot be detected, the alarm delay timer times-out and path Y is selected at the Alarm Delay Timer Time Out logic decision block. In this event path Y is selected, the Trigger Audio/Visual Alarms (T2) logic block is selected. The audio/visual alarms alert the driver that the vehicle is drifting out of the intended lane of travel. An audio alarm could be a beep type sound or a synthesized voice warning the driver with a verbal message such as "check your lane". After the audio and visual alarms have been activated for time period T2, the audio and visual alarms are deactivated at logic block Deactivate Alarms and Indicators. Once the alarms and indicators have been deactivated, the warning indicator is activated at the Activate Warning Indicator logic block and the logic flow returns to the Start logic block.

FIG. 8 shows a schematic realization of the logic flow block diagram of FIG. 7. Threshold detector output 1P and 1N from FIG. 5 are provided to the logic circuit inputs of FIG. 8 that develop the LDT for use by the timers and counters. It should be noted that only one channel comprising 1P and 1N are shown in FIG. 5 and inputs to the logic circuits of FIG. 8 also show a second detector channel, 2P and 2N. Threshold detectors 2P and 2N comprise similar circuit components as channel one of FIG. 5. It should be understood that two channels are required to detect the lateral drift direction of a vehicle or to detect when a vehicle is in the middle of a lane. Referring to FIG. 8, positive threshold inputs 1P and 2P are converted to a 1 ms pulse by one-shot circuit 21 and negative threshold detector inputs 1N and 2N are converted to a 1 ms pulse by one-shot circuit 22. Converting the threshold detector inputs to a 1 ms pulse ensures that very long LDTs, such as in the event only a positive threshold detection occurs when the vehicle speed is too slow, does not adversely affect the counter and timer outputs as will be explained below.

It should be understood that uniform road line detection timing, or uniform LDTs result from road lines being applied to a road according to exact and uniform specifications. The Department of Transportation Manual on Uniform Traffic Control Devices (MUTCD) cites specifications for all types of road line length and gap including those for short and normal broken road lines referred to in the present patent. For example, short road lines are called "dotted extension of edge lines" and are referred to when describing off-ramp road lines in the gore area of a highway where the lane is an exiting type. Solid road lines can also be "channelizing lines" referred to when describing road lines around objects such as an island or at an overpass and are wider than the normal four-inch wide edge line placed near the edge of the roadway. Although there are some state-to-state deviations, road line length and gap are always uniform.

It should be understood that two criteria for road lane detection result due to their uniform length and gap. The first criterion is road lines are periodic rather than random and the second is the length of road lines is relatively constant. Further, a vehicle acceleration or deceleration is somewhat constant due to the momentum of the vehicle and physical limitations of the accelerator and brakes. Timers and counters shown in FIG. 8 utilize these criteria to determine vehicle speed and other lane characteristics by comparing the number of timing pulses that occur during a LDT to the number of timing pulses expected at a certain vehicle speed. Generally, a slower vehicle speed results in more timing pulses detected, because the line detection time is longer, whereas a faster vehicle speed results in fewer timing pulses detected, because the line detection time is shorter. In addition, exiting lanes in the gore area of a highway can be distinguished because lane drop markings at exit ramps are three feet in length with a nine-foot gap compared to normal broken white lines that are ten feet in length with a thirty-foot gap. This very short road line results in the least number of timing pulses detected. In the instance these lane drop markings are detected, an indicator is activated to alert the driver that the lane is exiting. It should be understood that most shadows, as well as potholes and other road surface anomalies are random and sporadic. The logic circuits are designed to eliminate random and sporadic timing signals as was explained in the description of the logic flow diagram below.

Referring to FIG. 8, the one-shot circuits will first be described for use later in the present patent. One-shot circuit 21 is comprised of Schmidt trigger inverter I1 and I3 and capacitor C7 and resistor R7. Prior to a road line detection, pull-up resistor R7 provides a high level at the input to Schmidt trigger inverter I3 resulting in a low level at the output of I3 that is then provided to the "set" input of flip-flop FF-1. In the event of a road line detection, a "logic 1" input at inverter I1 results in a low level output at I1 that is provided to capacitor C7. The low level input at capacitor C7 drops the voltage at junction C7 and R7 to about zero volts. This low level is provided to Schmidt trigger inverter I3 causing its output to go to a high level. The voltage at junction C7 and R7 starts going high according to the time constant of R7 and C7 connected in series. When the input voltage of Schmidt trigger inverter I3 reaches the Schmidt trigger inverter trip point voltage of about eight volts, the output of I3 goes from a high to a low level. The values shown for R7 and C7 are satisfactory for producing a 1 ms square wave pulse output at I3 in the event the positive threshold detector goes from a low to high level. In the same manner that a 1 ms pulse is developed at the beginning of a road line, a similar 1 ms pulse is developed at the end of a road line. Initially, pull-up resistor R8 provides a high level at the input to Schmidt trigger inverter I4 resulting in a low level at the output of I4. One-shot circuit 22 is comprised of Schmidt trigger inverter I2 and I4 and capacitor C8 and resistor R8. A "logic 1" input at inverter I2 results in a low level output at I2 that is provided to capacitor C8. The low level output provided to capacitor C8 drops the voltage at junction C8 and R8 to about zero volts. This low level is provided to Schmidt trigger inverter I4 causing its output to go to a high level. The voltage at junction C8 and R8 starts going high according to the time constant of R8 and C8 connected in series. When the input voltage of Schmidt trigger inverter I4 reaches the Schmidt trigger inverter trip point voltage of about eight volts, the output of I4 goes from a high to a low level. The values shown for R8 and C8 are satisfactory for producing a 1 ms square wave pulse with each negative threshold detector low to high level change.

Initially, the flip-flops, timers and counters shown in FIG. 8 are in their reset state awaiting threshold detector signal inputs as a result of a detected road line. A central component of the circuitry is master counter CTR-M. Master counter CTR-M provides a LDT signal within the LDTI. Output logic signals from flip-flop FF-1 control the function of the master counter and its clock circuit 20. Outputs from CTR-M are used to provide clock signals to the city driving detection counter CTR-C, highway driving detection counter CTR-H and exiting lane detection counter CTR-E. Counters CTR-C and CTR-H are always enabled by connecting their "low enable" inputs to ground. These counters are Johnson Decade counters that advance one time slot per each input clock signal at the "CK" input. When the counter is "reset" time slot "0" is selected. Clock signals are provided by clock circuit 20 that consist of current limiting resistor R6, transistor T1, Schmidt trigger inverters Y1 and Y2 and resistor R6 and capacitor C6.

In the initial "reset" state, FF-1 has a "logic 0" at its Q1 output that is provided to current limiting resistor R6 and then to the base of PNP transistor T1. Transistor T1 is in its on state by the "logic 0" at its base junction causing capacitor C6 to be shunted to ground by the transistor. This results in a low level input to Schmidt trigger inverter Y1 and a high level output. This high level output is provided to Schmidt trigger inverter Y2 resulting in a low level output that is then provided to clock input "CK" of CTR-M. Also, while FF-1 is reset, its Q2 output is a "logic 1" that is provided to the CTR-M "low level enable" and "high level reset" inputs resulting in CTR-M being "disabled" and "reset".

At the beginning of a road line, logic circuit input 1P or 2P goes from a low to a high level which is provided to "OR" gate C3 as well as other logic gates in the circuit. Output C3 goes from a "logic 0" to a "logic 1" which is provided to the "clock" input of flip-flop FF-6 and also to the input of inverter I1. A high level input to circuit 21 results in the 1 ms square wave output pulse from I3 as previously explained. The 1 ms pulse from one-shot circuit 21 is then provided to the "set" input of flip-flop FF-1 causing a "logic 1" output at Q1 and a "logic 0" output at Q2. FF-1 data and clock inputs are not used and are connected to ground. The "logic 0" at the Q2 output of FF-1 is provided to the "low level enable" and "high level reset" inputs of CTR-M that enables the counter at its reset output time slot "0". Since FF-1 is "set", a "logic 1" results at Q1 that is provided to the negative base junction of T1 causing T1 to go from the on state to the off state. When T1 goes from the on state to the off state, clock timing capacitor C6 is no longer shunted to ground and capacitor C6 begins to charge according to the time constant of R6 and C6. FIG. 9 shows the first two square wave pulses A generated by the clock circuit in relation to waveform B resulting from the RC time constant developed by R6 and C6. At time V, transistor T1 goes from the on state to the off state causing capacitor C6 to begin charging according to the time constant of capacitor C6 and resistor R6. At time W, capacitor C7 is charged to the eight-volt Schmidt trip point voltage causing Schmidt trigger inverter Y1 to go from a low to a high level output corresponding to the leading edge of the first clock pulse of square wave A. Square wave pulses continue to be produced by the clock circuit until transistor T1 goes to its on state such as when the end of a road line is detected.

When the end of a road line is detected, Negative Threshold Detector inputs 1N or 2N cause a "logic 1" to be provided to the input of "OR" gate C4. The output at "OR" gate C4 then goes from a low to a high level. A high level input to circuit 22 results in the 1 ms square wave output pulse from I4 as previously explained. This 1 ms pulse from I4 is then provided to "AND" gates D2, D3, K2 and D4 according to the LDT of a detected road line.

The LDT of an exiting lane is the shortest interval resulting in CTR-M selecting time slot "0" when the end of an exiting road line is detected. In this event, "AND" gate D3 has a "logic 1" provided by CTR-M and a 1 ms pulse from circuit 22 resulting in a clock signal at the "CK" input of CTR-E. Exit lane counter CTR-E is only enabled when master counter flip-flop FF-1 is enabled to prevent signals, caused primarily from shadows, from providing clock signals to the counter. In the event nine continuous clock signals are provided to the "CK" input of CTR-E, time slot "9" will be selected. When time slot "9" is selected, a "logic 1" will be provided to flip-flop FF-5. The output of FF-5 is provided to indicator E to alert the driver that the lane is exiting and also to "OR" gate E1 that in turn provides a "logic 1" to the "reset" input of flip-flop FF-4. Conversely, when FF-4 is "set", the audio and visual alarm timer TMR-4 can be triggered for about one second to alert the driver that road lines are no longer detected such as in the event the vehicle is drifting off the roadway. However, in the instance the vehicle is in an exiting lane the exit lane counter circuit activates warning indicator E and disables the audio and visual alarm circuit. The vehicle can therefore exit the highway without the audio and visual alarms activating.

In the instance CTR-M selects either time slot "1", "2" or "3", a "logic 1" is provided to "OR" gate B2 which in turn provides a "logic 1" to "AND" gate D2. If the end of a road line or LDT occurs during this time period, the 1 ms one-shot pulse provided from circuit 22 to "AND" gate D2 results in a "logic 1" output at D2. The "logic 1" output at D2 is provided to the clock input "CK" of CTR-H to advance the highway driving counter CTR-H one count. This "logic 1" is also provided to "OR" gate H3. The output of "OR" gate H3 then goes from a "logic 0" to a "logic 1" resulting in a "logic 1" at the "reset" input of CTR-C causing the city driving counter to be "reset". In the event counter CTR-H time slot "6" is selected, as a result of six consecutive highway road lines being detected, a clock pulse is provided to the clock input of highway flip-flop FF-3 resulting in output Q1 going to a "logic 1". This "logic 1" is provided to the highway driving indicator H, the "reset" of city flip-flop FF-2 via "OR" gate V1, and the input of "OR" gate J2. A "logic 1" input to "OR" gate J2 results in a "logic 1" output that is then provided to the input of "AND" gate W1. "AND" gate W1 has a 1 ms pulse applied to its other input during the time J2 is a "logic 1" resulting in a "logic 1" at the output of W1. This "logic 1" input is then provided to the "set" input of FF-4 causing a "logic 1" output at Q1 that is then provided to the input of "OR" gate J3. This "logic 1" at the input of J3 results in a "logic 1" at its output that is provided to the "CD" input of TMR-4 that enables TMR-4 to be triggered in the instance the vehicle is drifting out of its lane. Once highway flip-flop FF-3 is "set", a "logic 1" is provided to the input of "AND" gate G2. Now when time slot "2" is selected by CTR-H, a "logic 1" will be provided to "OR" gate J4 causing the J4 output to go from a "logic 0" to a "logic 1". This low to high level signal is provided to the clock input of FF-4 that will result in a "logic 1" output at Q1 of FF-4. When a road line is not detected within the LDTI, master counter CTR-M continues counting until time slot "9" is selected at which time counters CTR-H and CTR-C are reset to allow CTR-H to begin counting starting at time slot "0". Therefore, when a road line is not detected within the LDTI, such as in the event of a shadow or faded road line, and if the alarm delay timer FF-4 has not timed out, only one city road line detected will prevent the audio and visual alarms from activating.

It should be observed that twice as many consecutive road lines are required to enable the audio and visual alarm FF-4 then to prevent the audio and visual alarm from activating in order to reduce false alarms. In the event the audio and visual alarms are activated, FF-2 is reset and three detected city road lines are once again required to detect city driving.

In the instance CTR-M selects either time slot "4", "5" or "6", a "logic 1" is provided to "OR" gate B1 which in turn provides a "logic 1" to "AND" gate D4. If the end of a road line or LDT occurs during this time period, the 1 ms one-shot pulse provided from circuit 22 to "AND" gate D4 results in a "logic 1" output at D4. The "logic 1" output at D4 is provided to the clock input "CK" of CTR-C to advance the city driving counter CTR-C one count. This "logic 1" is also provided to "OR" gate H2 causing a "logic 1" at the "reset" input of CTR-H, resetting the highway driving counter. In the event CTR-C time slot "3" is selected as a result of three consecutive city road lines being detected, a clock pulse is provided to the clock input of highway flip-flop FF-2 resulting in its Q1 output going to a "logic 1". This "logic 1" is provided to the city driving indicator C, the reset of highway flip-flop FF-3 via "OR" gate V2, and the input of "OR" gate J2. A "logic 1" input to "OR" gate J2 results in a "logic 1" output that is then provided to "AND" gate W1. "AND" gate W1 has a 1 ms pulse applied to its other input during the time J2 is a "logic 1" resulting in a "logic 1" at the output of W1. This "logic 1" is provided to the "set" input of FF-4 causing a "logic 1" output at Q1 that is provided to the input of "OR" gate J3. This "logic 1" at the input of J3 results in a "logic 1" at its output that is provided to the "CD" input of TMR-4 that enables TMR-4 to be triggered in the instance the vehicle is drifting out of its lane. Once city flip-flop FF-2 is "set", a "logic 1" is provided to the input of "AND" gate G1. Now when time slot "1" is selected by CTR-C, a "logic 1" will be provided to "OR" gate J4 causing the J4 output to go from a "logic 0" to a "logic 1". This low to high level signal is provided to the clock input of FF-4 that will result in a "logic 1" output at Q1 of FF-4. When a road line is not detected within the LDTI, master counter CTR-M continues counting until time slot "9" is selected at which time counters CTR-H and CTR-C are reset to allow CTR-C to begin counting starting at time slot "0". Therefore, when a road line is not detected within the LDTI, such as in the event of a shadow or faded road line, and if the alarm delay timer FF-4 has not timed out, only two city road lines detected will prevent the audio and visual alarms from activating. In the event the audio and visual alarms are activated, FF-3 is reset and six detected highway road lines are once again required to detect highway driving.

Again, it should be observed that twice as many consecutive road lines are required to enable the audio and visual alarm FF-4 then to prevent the audio and visual alarm from activating in order to reduce false alarms.

However, when road lines are not detected during either city or highway driving, resulting in timer TMR-1 not being triggered within about two seconds, such as when the vehicle is drifting out of its intended lane, TMR-1 times out. When TMR-1 times out, output Q1 of TMR-1 goes to a "logic 0". This provides a "positive to negative going" signal to the B input of audio and visual timer TMR-4 causing TMR-4 output Q1 to go to a "logic 1" during its timer triggered period. In the event the audio and visual alarms are activated, the "logic 1" output at TMR-4 is provided to "OR" gate H1 that "resets" audio and visual alarm control flip-flop FF-4. Output Q2 of FF-4 is now a "logic 1". The "logic 1" is then provided to "OR" gate E2 to activate warning indicator W. Warning indicator W is always activated when the audio and visual alarms are not enabled.

In the instance CTR-M selects time slot "7" or "8" before the audio and visual alarms are enabled, no audio or visual indicator change occurs and the master counter advances one time slot until time slot "9" is selected. When time slot "9" is selected a "logic 1" is provided to "OR" gate E3. Since the audio and visual alarms are not activated, the other input of "OR" gate E3 is a "logic 0". The output of gate E3 then goes from a "logic 0"to a "logic 1". The "logic 1" is provided to the input of "OR" gate B3. The other two inputs of B3 are a "logic 0" because no road line and no shadow has been detected. The output of B3 then goes from a "logic 0" to a "logic 1" which is provided to the "reset" of FF-1 to "reset" and "disable" master counter CTR-M as explained previously.

In the instance a driver is slowing a vehicle, such as when a traffic light or stop sign is encountered, the audio and visual alarms are enabled and city driving is detected. When the vehicle slows to about 20 mph, the LDT will exceed the LDTI. In order to prevent the alarms from activating during this intentional slowing or stopping the audio and visual alarms are disabled. During this event, city driving flip-flop FF-2 is "set" resulting in Q1 being a "logic 1" which is provided to "AND" gate K2. "AND" gate K2 also has a "logic 1" provided to its input by "OR" gate E4 because CTR-M has selected time slot "7" or "8" as a result of the vehicle slowing. A 1 ms pulse from circuit 22, at the end of the next road line detected, will then be provided to "AND" gate K2 resulting in a "logic 1" output that is provided to the input of "OR" gates H1, H2 and H3. This "logic 1" input to the "OR" gates result in counter CTR-C and CTR-H being "reset" and alarm control flip-flop FF-4 being "reset". When FF-4 is reset, the audio and visual alarms are no longer enabled to prevent the alarms from annoying or distracting the driver.

In the event the positive threshold detector goes from a low to a high level and remains at a high level for a period of time that allows CTR-M to select time slot "9", such as in the event a vehicle goes out from under an overpass, a "logic 1" output at time slot "9" is provided to "OR" gate E3 that in turn provides a "logic 1" to "OR" gate B3. "OR" gate B3 then provides a "logic 1" to the "reset" input of FF-1 to "reset" and "disable" master counter CTR-M. However, in order for FF-1 to be "reset", the "set" input of FF-1 must be a "logic 0". One-shot circuit 21 was implemented in the design to allow FF-1 to be "reset" when CTR-M time slot "9" is selected because the 1 ms pulse form circuit 21 is much shorter than the time the positive threshold detector would be at the high level. At this time, the logic circuits are in a wait status pending the detection of a shadow or beginning of a road line.

As mentioned, shadows can cause road line detection problems. Generally, road lines may not be detectable when a shadow results in the positive and negative threshold detectors toggling. In addition, shadows from such objects as a row of trees on the side of the road can cause the alarm circuits to enable resulting in erroneous lane detection and alarm activation. This is because the uniform spaced row of trees can produce uniform shadows and uniform timing signals, similar to the LDT of a road line. Shadow threshold detector circuit 18 of FIG. 5 is used to prevent these false signals from causing erroneous road line detection problems. Since the shadow threshold detector 1S provides a low to high level output only when a shadow is detected, the shadows can be identified. Once the shadow is detected either the master counter is disabled, during the period of time shadows are detected, or additional time is allowed before the alarm is activated, in the event the alarm circuits have already been enabled. FIG. 8 shows shadow threshold detector output 1S connected to the "positive-going" trigger input "A" of shadow detection timer TMR-3. Timer TMR-3 is a retriggerable timer where a series of shadows will continually retrigger TMR-3 causing output Q1 to remain at a "logic 1". During the time the shadow detection timer TMR-3 is triggered a "logic 1" output is provided at Q1. This "logic 1" is provided to the input of "OR" gate E2, to activate warning indicator W, and also to the input of "AND" gate D1. It should be noted that the warning indicator is activated whenever a shadow is detected however the alarms are not activated unless road lines are no longer detected. If the audio and visual alarm control flip-flop FF-4 has not been "set", such as when highway or city driving is not detected, a "logic 1" is provided from FF-4 output Q2 to the input of "AND" gate D1. A "logic 1" output from "AND" gate D1 is then provided to "OR" gate B3 that in turn provides a "logic 1" to the "reset" input of FF-1 preventing shadow signals from being confused with road line signals by disabling master counter CTR-M. Timer T3 output Q1 remains at a "logic 1" for about half a second in each event of a shadow detection.

A vehicle traveling in the middle of a lane can also be detected by the logic circuits of FIG. 8. In this instance, indicators are activated to inform the driver that the vehicle is properly positioned in the lane of travel. Middle of the lane signals are also used to prevent the alarms from activating in the event road lines simply cease, such as where road lines have not been painted, or in an intersection where there are no road lines. Positive threshold detector signals 1P and 2P are provided to the input of "AND" gate F1 and are used to detect the middle of the lane. Also, the photodiode detectors are positioned so that the area of detection of the photodiodes overlaps. The output of "AND" gate F1 is then provided to the "set" input of middle of the lane detector flip-flop FF-6. The output of "OR" gate C3 is provided to the clock input of FF-6 in the event of a positive channel 1 or positive channel 2 threshold detector input signal, such as in the event the vehicle is in the left or right side of the lane respectfully. According to the flip-flop design characteristics, the "set" input of FF-6 is dominant over the clock input. Therefore, if "AND" gate F1 has a "logic 1" output (in the instance both 1P and 2P signals are present) such as when the vehicle is in the middle of a lane, a "logic 1" output will result at output Q1 of FF-6. Clock signals only effect the Q1 output on the leading edge of the clock signal and therefore no longer have an effect on the output so the output of FF-6 remains a "logic 1". This "logic 1" output activates indicator M to alert the driver that the vehicle is in the middle of the lane.

Finally, while road lines are continuously detected, such as when driving long distances on a highway, the alarm delay timer output remains at a "logic 1" and the alarms are enabled but not activated.

It is important to note that a vehicle owner will soon disconnect or disable any device he or she finds annoying, even if it is a safety device. For example, when seat belts were first introduced in the 60s, owners would disconnect the buzzer that would indicate when a seat belt was not buckled. Later, the buzzers were replaced with a soft chime (audio indicator) and an instrument indicator light (visual indicator) that would turn off after only a few seconds when the seat belt was not buckled, which has generally been acceptable to vehicle owners. Similarly with the Infrared Road Line Detector, a significant effort has been made to prevent the occurrence of false alarms so that a vehicle owner will not be inclined to disable or disconnect the device. At any rate, a primary function of the Infrared Road Line Detector is to alert the driver when the vehicle is drifting out of its intended lane of travel.

The timing diagram of FIG. 10 shows a representative operation of the circuitry of FIG. 8 in the event that city driving is detected. Initially no road lines have been detected and the counters, flip-flops and counters of the circuit are in their reset state. The beginning of the first road line is indicated by time M in FIG. 10. At the end of the first road line, one-shot circuit 22 of waveform D provides a 1 ms pulse at time "0." At time "0," TMR-2/Q2 output goes from a high to a low level shown by waveform I removing the "reset" at CTR-C. When the beginning of the next road line is detected a 1 ms one-shot pulse at the output of circuit 21 results in FF-1 being "set" and CTR-M and its clock circuit 20 is then enabled starting at time slot "0" as described above. At time N the 1 ms one-shot pulse output of circuit 21, shown by waveform C and master counter flip-flop FF-1/Q1 output, shown by waveform E, goes from a "logic 0" to a "logic 1". Clock signals shown by waveform B are then provided to the master counter clock input advancing the output time slot one slot per clock signal. At time P the end of a road line is detected resulting in a 1 ms one-shot output pulse at circuit 22 as shown by waveform D. The one-shot pulse advances the city counter output one time slot resulting in output time slot "1" being selected at time P. The output time slot selected by the city counter is shown by sequential time slot waveform A. At time P the master counter flip-flop FF-1 is also "reset" resulting in master counter being "disabled" and "reset". Four clock signals are provided to the input of the master counter between time N and time P as shown by waveform B. At time R, the sequence is again repeated with four clock signals counted by the master counter resulting in city counter time slot "2" being selected by the sequence described above. At time S, city counter time slot "3" is selected. This results in the warning indicator W being deactivated by output FF-4/Q2 going from a "logic 1" to a "logic 0" as shown by waveform G and the warning indicator W being deactivated as shown by waveform L. Alarm delay timer TMR-1/Q1 then goes from a "logic 0" to a "logic 1" as shown by waveform H. Finally, the city detected flip-flop output FF-2/Q1 goes from a "logic 0" to a "logic 1" as shown by waveform J and the city detected indicator C is activated as shown by waveform K.

A block diagram of the Digital Road Line Detector of the invention is shown in FIG. 11. The above described detector method is preferred rather than a camera method due to such problems as road line Fuzzy Noise or noise in the image data resulting in a substantial time required for the image processing procedure. The detection method of the present invention uses photodiodes to detect a specific area rather than a fine image inherent with camera detection methods.

Circuit 19 of FIG. 5 consists of a microprocessor compatible Analog to Digital converter and serial and parallel Digital Interface. The microprocessor data and address bus configurations must match the microprocessor compatible Analog to Digital converter for the circuit to work properly. Multiple channels can be realized with modem microprocessor compatible Analog to Digital converters to detect multiple Pulse Amplifier detector channels such as the channel shown by the Digital Interface of circuit 19 of FIG. 5.

Computer memory tables of the road line amplitude and frequency values are built using sampled data from the Pulse Amplifier output of circuit 15 of FIG. 5. These tables are stored in temporary memory such as RAM in a host computer in a well-known manner. Further, the sampled amplitude and time values are such that the amplitude and time can be correlated for comparison to models that have been previously developed and stored on the host computer. For example, the table values of sampled data described above are compared to amplitude and time model values previously developed. The host computer software program determines if the stored model data matches the sampled data. A model of the amplitude and time values of the waveform FIG. 6 would be the type of model used for comparison to sampled amplitude and time table values.

Referring to FIG. 11, the Start block indicates the beginning of the Digital Road Line Detector process. Pulse Amplifier channels are sampled at the Sample Pulse Amplifier Channels logic block. The sampled amplitudes and times are then stored in the host computer memory tables. These stored amplitudes and times are then compared to the stored models to determine if there is a correlation between the sampled values and the model values. If there is a correlation between sampled and model values indicators are illuminated to indicate that the vehicle is properly in the lane of travel and the sampling process starts over. In the event the sampled values do not correlate to the model values indicators alert the driver that the vehicle lane deviation is imminent and the process returns to the start logic block.

Whereas the invention is here illustrated and described with reference to embodiments thereof presently contemplated as the best mode of carrying out the invention in actual practice, it is to be understood that various changes may be made in adapting the invention to different embodiments without departing from the broader inventive concepts disclosed herein and comprehended by the claims that follow.

I claim:

1. A detector for detecting light reflected from discontinuous lane dividing lines on a highway surface from a moving motor vehicle, comprising:
   a photodetector mounted to receive light reflected from the discontinuous lane dividing lines when the vehicle is properly within a lane but not otherwise;
   circuitry to provide an indication for each lane dividing line sensed;
   circuitry to provide an indication of a characteristic of the line sensed;
   logic circuitry to determine if a line is sensed within successive fixed periods of time in which it is expected that a line should be sensed and, if a line is sensed, to determine if the characteristic sensed for that line is consistent with prior lines sensed; and
   an alarm to, when enabled, provide an alarm indication if the logic circuitry determines that a line consistent with prior lines is not sensed within one of the successive fixed periods of time.

2. A detector for detecting light reflected from discontinuous lane dividing lines on a highway according to claim 1, wherein the characteristic of the line sensed is representative of the length of the line.

3. A detector for detecting light reflected from discontinuous lane dividing lines on a highway according to claim 2, wherein the circuitry to provide an indication for each lane dividing line sensed produces a pulse for each line sensed.

4. A detector for detecting light reflected from discontinuous lane dividing lines on a highway according to claim 3, wherein the circuitry to provide an indication for each lane dividing line sensed produces a pulse at the beginning of each line sensed.

5. A detector for detecting light reflected from discontinuous lane dividing lines on a highway according to claim 3, wherein the circuitry to provide an indication for each lane dividing line sensed produces a pulse at the end of each line sensed.

6. A detector for detecting light reflected from discontinuous lane dividing lines on a highway according to claim 3, wherein the circuitry to provide an indication for each lane dividing line sensed produces a pulse indicating the beginning of each line sensed and a pulse indicating the end of each line sensed.

7. A detector for detecting light reflected from discontinuous lane dividing lines on a highway according to claim 6, wherein the circuitry to provide an indication of a characteristic of the line sensed senses the time between the pulse indicating the beginning of the line and the pulse indication the end of the line.

8. A detector for detecting light reflected from discontinuous lane dividing lines on a highway according to claim 1, wherein the circuitry to provide an indication for each lane dividing line sensed produces a pulse indicating the beginning of each line sensed and a pulse indicating the end of each line sensed.

9. A detector for detecting light reflected from discontinuous lane dividing lines on a highway according to claim 8, wherein the circuitry to provide an indication of a characteristic of the line sensed senses the time between the pulse indicating the beginning of the line and the pulse indication the end of the line.

10. A detector for detecting light reflected from discontinuous lane dividing lines on a highway according to claim 1, additionally including a light source directed to illuminate the highway surface being sensed when ambient light is not sufficient to illuminate the lines for detection.

11. A detector for detecting light reflected from discontinuous lane dividing lines on a highway according to claim 10, wherein the light source produces infrared light.

12. A detector for detecting light reflected from discontinuous lane dividing lines on a highway according to claim 11, wherein the photodetectors detect reflected infrared light.

13. A detector for detecting light reflected from discontinuous lane dividing lines on a highway according to claim 1, wherein the detector additionally includes a plurality of photodetectors.

14. A detector for detecting light reflected from discontinuous lane dividing lines on a highway according to claim 1, wherein differences in light detected by different photodetectors indicate detection of the lane dividing line and position of the lane dividing line relative to the detector.

15. A detector for detecting light reflected from discontinuous lane dividing lines on a highway according to claim 14, wherein continuous lines are provided along an edge of a highway, and wherein the detector senses the continuous line with the differences in light detected by different photodetectors indicating the position of the continuous line relative to the detector.

16. A detector for detecting light reflected from discontinuous lane dividing lines on a highway according to claim 1, wherein the logic circuitry is a programmed computer.

17. A detector for detecting light reflected from discontinuous lane dividing lines on a highway according to claim 1, additionally including circuitry to provide an indication for each shadow sensed.

18. A detector for detecting light reflected from discontinuous lane dividing lines on a highway according to claim 17, wherein the logic circuitry distinguishes a shadow sensed from a line sensed.

19. A detector for detecting light reflected from discontinuous lane dividing lines on a highway according to claim 1, wherein the indication of a characteristic of the line sensed is indicated by category.

20. A detector for detecting light reflected from discontinuous lane dividing lines on a highway according to claim 19, wherein the categories represent a characteristic of high speed highway driving and a characteristic lower speed city highway driving.

21. A detector for detecting light reflected from discontinuous lane dividing lines on a highway according to claim 20, wherein the categories are defined by the number of lines expected to be detected in a set period of time.

22. A detector for detecting light reflected from discontinuous lane dividing lines on a highway according to claim 1, wherein the characteristic of the line sensed is the amplitude and time of the sensed signal which is compared to a model signal.

23. A detector for detecting light reflected from discontinuous lane dividing lines on a highway according to claim 1, wherein particular short discontinuous lines on a highway indicate an exit lane, and wherein the logic circuitry recognizes lines indicating an exit lane.

24. A detector for detecting light reflected from discontinuous lane dividing lines on a highway according to claim 1, wherein the logic circuitry senses when the vehicle is slowing down and disables the alarm when the vehicle speed drops below a preset speed.

25. A detector for detecting light reflected from discontinuous lane dividing lines on a highway surface from a moving motor vehicle, comprising:

a photodetector mounted to receive light reflected from the discontinuous lane dividing lines when the vehicle is properly within a lane but not otherwise;

detection means to provide an indication for each lane dividing line sensed;

detection means to provide an indication of a characteristic of the line sensed;

means to determine if a line is sensed within successive fixed periods of time in which it is expected that a line should be sensed and, if a line is sensed, to determine if the characteristic sensed for that line is consistent with prior lines sensed; and an alarm to, when enabled, provide an alarm indication if the logic circuitry determines that a line consistent with prior lines is not sensed within one of the successive fixed periods of time.

26. A detector for detecting light reflected from discontinuous lane dividing lines on a highway according to claim 25, wherein the means to determine if a lane is sensed is a programmed computer.

27. A method for detecting whether a vehicle is maintaining position in a highway lane marked by at least one set of discontinuous lane dividing lines on the highway surface, comprising the steps of:

detecting, using a photodetector, discontinuous lane dividing lines marking the lane in which the vehicle is traveling;

determining, using the photodetector, a characteristic of the line sensed;

determining through logic circuitry if a line is detected in each of a succession of time periods in which it would be expected lines would be detected if the vehicle stayed in the lane and detected such lines and, if a line is detected, determining if the characteristic sensed for that line is consistent with prior lines sensed; and giving an alarm if consistent lines are not detected in each of the expected successive time periods, such consistent lines not being detected indicating the lines are not being sensed and possible drift of the vehicle out of the lane.

28. A method for detecting whether a vehicle is maintaining position in a highway lane marked by at least one set of discontinuous lane dividing lines on the highway surface according to claim 27, wherein the step of determining through logic circuitry is performed by a programmed computer.

* * * * *